United States Patent
Yoo et al.

(10) Patent No.: US 12,482,901 B2
(45) Date of Patent: Nov. 25, 2025

(54) BATTERY MODULE

(71) Applicant: SK ON CO., LTD., Seoul (KR)

(72) Inventors: Tak Kyung Yoo, Daejeon (KR); Yang Kyu Choi, Daejeon (KR); Ji San Kim, Daejeon (KR); Seo Roh Rhee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 578 days.

(21) Appl. No.: 17/959,825

(22) Filed: Oct. 4, 2022

(65) Prior Publication Data

US 2023/0344086 A1    Oct. 26, 2023

(30) Foreign Application Priority Data

Apr. 22, 2022    (KR) .................. 10-2022-0050125

(51) Int. Cl.
*H01M 50/503*    (2021.01)
*H01M 50/211*    (2021.01)
*H01M 50/271*    (2021.01)
*H01M 50/507*    (2021.01)

(52) U.S. Cl.
CPC ....... *H01M 50/503* (2021.01); *H01M 50/211* (2021.01); *H01M 50/271* (2021.01); *H01M 50/507* (2021.01)

(58) Field of Classification Search
None
See application file for complete search history.

(56) References Cited

U.S. PATENT DOCUMENTS

| | | | |
|---|---|---|---|
| 2015/0136438 A1* | 5/2015 | Lumetta | H01R 4/029 174/68.2 |
| 2018/0183020 A1* | 6/2018 | Ju | H01M 50/509 |
| 2020/0099034 A1 | 3/2020 | Jin et al. | |
| 2021/0036295 A1 | 2/2021 | Park et al. | |
| 2021/0135175 A1 | 5/2021 | An et al. | |

(Continued)

FOREIGN PATENT DOCUMENTS

| | | |
|---|---|---|
| CN | 213243054 U | 5/2021 |
| EP | 4037082 A1 | 8/2022 |

(Continued)

OTHER PUBLICATIONS

Extended European Search Report for European Patent Application No. 22199687.9, mailed Aug. 8, 2023 (7 pages).

*Primary Examiner* — Gregg Cantelmo
(74) *Attorney, Agent, or Firm* — Perkins Coie LLP (57) ABSTRACT

A battery module including a cell stack including a plurality of battery cells that are stacked on top of one another, the plurality of battery cells including electrode leads, at least one bus bar structured to provide a plurality of through-slits into which the electrode leads are inserted, and a bus bar frame coupled to the at least one bus bar, the bus bar frame having a plurality of through-holes in which the electrode leads are disposed. Each of the through-slits may include a first guide portion structured to include a first space wider than a width of a corresponding through-slit for a corresponding electrode lead to be inserted toward the through-slit, and the bus bar frame may include a second guide portion structured to include a second space that extends from the first space and has a width wider than the first space.

16 Claims, 5 Drawing Sheets

(56) References Cited

U.S. PATENT DOCUMENTS

2022/0077519 A1    3/2022  An et al.
2022/0094003 A1    3/2022  Jo et al.

FOREIGN PATENT DOCUMENTS

| KR | 10-2018-0116958 A | 10/2018 |
|----|-------------------|---------|
| KR | 10-2019-0107396 A | 9/2019 |
| KR | 10-2021-0041447 A | 4/2021 |
| KR | 10-2021-0053053 A | 5/2021 |
| KR | 10-2271377 B1     | 6/2021 |
| KR | 10-2021-0110555 A | 9/2021 |
| KR | 10-2022-0031226 A | 3/2022 |
| KR | 10-2022-0040895 A | 3/2022 |

\* cited by examiner

BATTERY MODULE

CROSS-REFERENCE TO RELATED APPLICATION(S)

This application claims benefit of priority to Korean Patent Application No. 10-2022-0050125 filed on Apr. 22, 2022 in the Korean Intellectual Property Office, the disclosure of which is incorporated herein by reference in its entirety.

TECHNICAL FIELD

The present disclosure relates to a battery module.

BACKGROUND

Unlike primary batteries, secondary batteries may be charged with electrical energy which may be discharged therefrom. Thus, the secondary batteries may be applied to devices within various fields, for example, digital cameras, mobile phones, notebook computers, and hybrid vehicles. Examples of the secondary batteries may include a nickel-cadmium battery, a nickel-metal hydride battery, a nickel-hydrogen battery, a lithium secondary battery, and the like.

Among secondary batteries, many studies into lithium secondary batteries having high energy density and discharge voltage have been undertaken. Recently, lithium secondary batteries have been manufactured as pouch-type or prismatic battery cells. A plurality of battery cells may be connected to form a module, and may be used in the form of a module.

SUMMARY

An aspect of the present disclosure provides a battery module that may be easily manufactured. For example, a battery module may be manufactured through a process of stacking battery cells to prepare a cell stack, and then coupling a bus bar assembly including electrical conductive connectors as bus bars to battery cells of the cell stack. In such designs, when the cell stack and the bus bar assembly are not smoothly coupled to each other during the manufacturing process, there may be difficulty in assembling the batter module. In implementing the disclosed technology in the present disclosure, a battery module may be designed to reduce or overcome such difficulty in assembling the battery module.

According to an aspect of the present disclosure, provided is a battery module including a cell stack including a plurality of battery cells that are stacked on top of one another, the plurality of battery cells including electrode leads, at least one bus bar formed of an electrically conductive material and structured to provide a plurality of through-slits into which the electrode leads are inserted, and a bus bar frame formed of an electrically insulating material and disposed between the at least one bus bar and the cell stack to be coupled to the at least one bus bar, the bus bar frame having a plurality of through-holes in which the electrode leads are disposed. Each of the through-slits may include a first guide portion structured to include a first space wider than a width of a corresponding through-slit for a corresponding electrode lead to be inserted toward the through-slit, and the bus bar frame may include a second guide portion structured to include a second space that extends from the first space and has a width wider than that of the second space.

The second space of the second guide portion may be connected to the first space of the first guide portion.

The second guide portion may include a protruding portion that is continuous with the first guide portion.

Each of the through-slits may include a space tapering in section from an end of a corresponding through-slit close to the battery cell to another end of the corresponding through-slit far from the battery cell.

The first guide portion may include a first inclined surface forming a first space that tapers in section for each of the electrode leads to be inserted into the through-slit.

The first inclined surface may be formed to have an inclination angle with respect to each of the electrode leads in the range of 27° to 45°.

The second guide portion may include a second inclined surface forming a second space that tapers in section for each of the electrode leads to be inserted into the first space of the first guide portion.

The second inclined surface may be formed to have an inclination angle with respect to each of the electrode leads, wherein the inclination angle of the second inclined surface less than an inclination angle of the first inclined surface.

The second inclined surface may be formed to have an inclination angle with respect to each of the electrode leads in a range of 27° to 45°.

A surface of the second guide portion facing the at least one bus bar may be bonded to the at least one bus bar.

At least a portion of the second guide portion may be inserted into the first space.

The second guide portion may be disposed to cover one surface of the at least one bus bar and the first inclined surface.

According to another aspect of the present disclosure, provided is a battery module including a plurality of cell stacks, each cell stack including a plurality of battery cells that are stacked on top of one another, the plurality of battery cells including electrode leads, a module frame structured to accommodate the plurality of cell stacks, at least one bus bar structured to provide a plurality of through-slits into which the electrode leads are inserted, and a bus bar frame disposed between at least one the bus bar and the plurality of cell stacks to be coupled to the at least one bus bar. Each of the through-slits may include a first guide portion structured to include a first space wider than a width of a corresponding through-slit for a corresponding electrode lead to be inserted toward the through-slit, and the module frame may include a first plate and a second plate disposed in parallel to face each other, and a connection plate disposed between the first plate and the second plate and connecting the first plate to the second plate.

The connection plate may divide a space between the first plate and the second plate into different subspaces, each of which accommodates the cell stacks.

The battery module may further include a frame cover extending between ends of the first plate and the second plate and disposed to face the connection plate. The cell stacks may be disposed between the connection plate and the module frame cover.

The battery module may further include a side cover extending between ends of the first plate and the second plate and disposed to face each of the electrode leads of the battery cells to be coupled to the module frame.

A wider surface of the battery cell may face the first plate or the second plate.

At least a portion of the bus bar frame may extend toward in a corresponding through-slit.

According to example embodiments of the present disclosure, in a battery module, a plurality of electrode leads may be simultaneously inserted into a through-slit of a busbar assembly in a process of coupling a cell stack and the busbar assembly to each other, thereby easily assembling the battery module, and minimizing time required for manufacturing.

In addition, a second inclined surface provided on a bus bar frame may be disposed to extend a first inclined surface provided on the through-slit of a bus bar, and thus each of the electrode leads may be easily guided to a central portion of the through-slit along the inclined surfaces, so that each of the electrode leads may be smoothly inserted into the through-slit.

In addition, the battery module may provide various heat dissipation paths using a connection plate and a frame cover of a frame, thereby more effectively dissipating heat generated from the cell stack.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
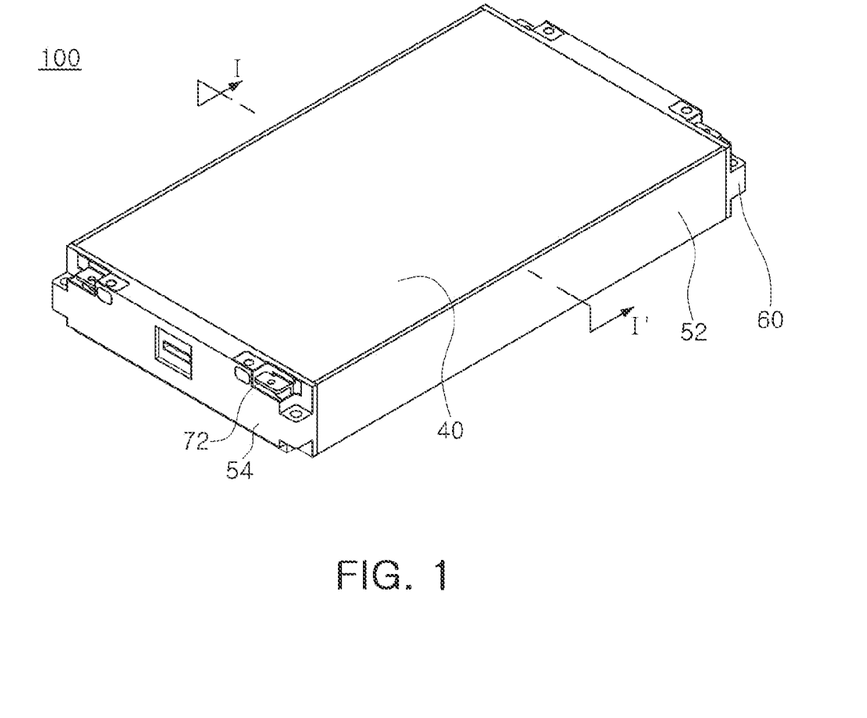
FIG. 1 is a perspective view schematically illustrating a battery module according to an example embodiment of the present disclosure.
Figure 2:
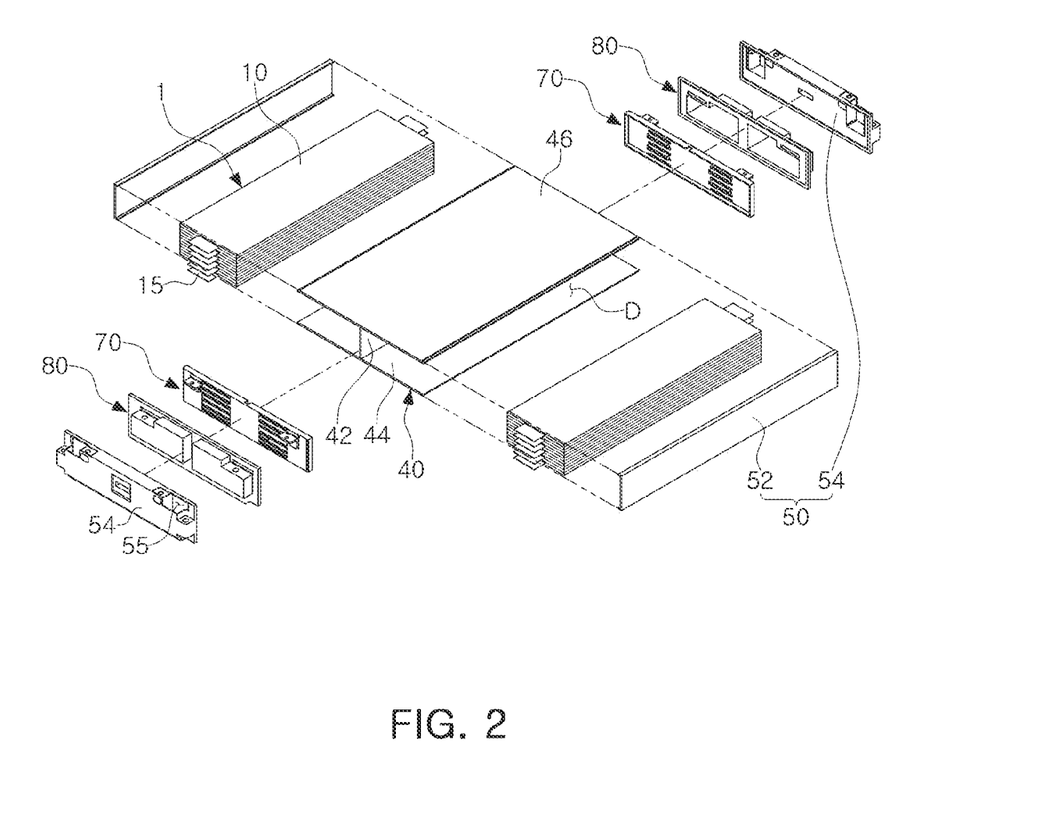
FIG. 2 is an exploded perspective view of the battery module illustrated in FIG. 1.
Figure 3:
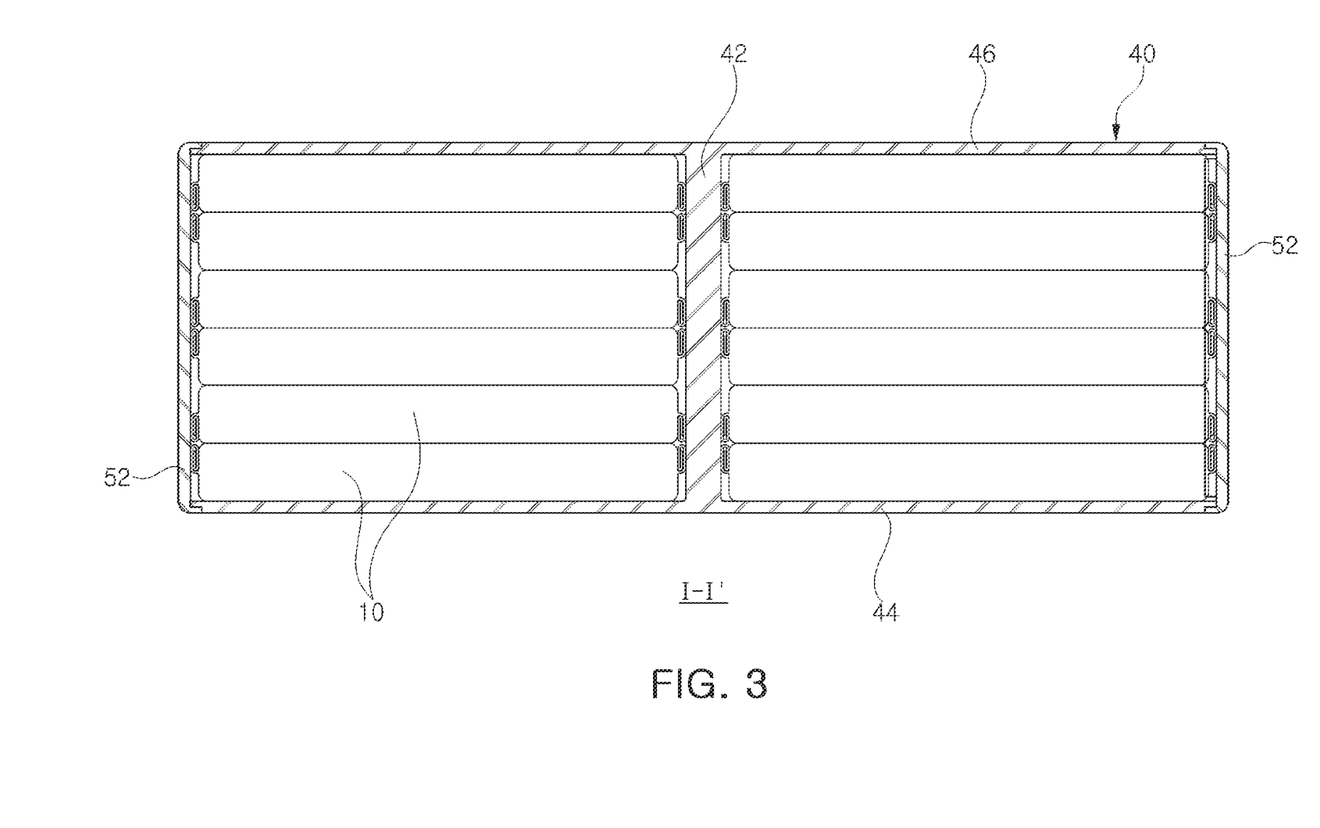
FIG. 3 is a cross-sectional view taken along line I-I' of FIG. 1.

FIG. 1 is a perspective view schematically illustrating a battery module according to an example embodiment of the present disclosure. FIG. 2 is an exploded perspective view of the battery module illustrated in FIG. 1. FIG. 3 is a cross-sectional view taken along line I-I of FIG. 1.

Referring to FIGS. 1 to 3, a battery module 100 according to the present example embodiment may include a cell stack 1 in which a plurality of battery cells 10 are stacked, a module frame 40, a cover member 50, an insulating cover 80, and a busbar assembly 70.

The cell stack 1 may be formed by stacking battery cells 10 in a thickness direction. Each of the battery cells 10 may be a pouch-type secondary batteries, and may have a structure in which an electrode assembly (not illustrated) is accommodated in a pouch-type case and an electrode lead 15 outwardly protrudes.

The electrode assembly may include a plurality of electrode plates and electrode tabs, and may be accommodated in the pouch-shaped case. The electrode plate may be formed by alternately stacking a plurality of positive plates and a plurality of negative plates. In this case, the plurality of positive plates and the plurality of negative electrode plates may respectively include an electrode tab, and each of electrode tabs may be connected to the electrode lead 15.

The case may be formed in the form of a container to provide an internal space in which an electrode assembly and an electrolyte (not illustrated) are accommodated.

Each of the battery cells 10 according to the present example embodiment may be disposed so that two electrode leads 15 face in opposite directions. However, the present disclosure is not limited thereto, and the two electrode leads 15 may be disposed to face in the same direction.

Although not illustrated, at least one buffer pad may be disposed between the stacked battery cells 10.

The buffer pad may be provided to suppress expansion of an overall volume of the battery cells when a specific battery cell expands. The buffer pad may be formed of a polyurethane foam material, but is not limited thereto.

When the buffer pad is formed of an adhesive material, the battery cells 10 may be bonded to each other by the buffer pad to form the battery cell stack 1. However, the present disclosure is not limited thereto, and a fixing member may be added to fix the stacked battery cells 10.

The battery cells 10 configured as described may be a lithium ion (Li-ion) battery capable of being charged and discharged.

The cell stack 1 may be inserted and disposed in an accommodating space D of the module frame 40.

The module frame 40 may include a first plate 44 and a second plate 46 disposed on lower and upper portions of the cell stack 1 in parallel to face each other, and a connection plate 42 disposed between the first and second plates 44 and 46 interconnecting the first and second plates 44 and 46 to each other.

The cell stack 1 may be inserted and disposed in the accommodating space D formed between the first and second plates 44 and 46.

The connection plate 42 may be disposed on one side of the cell stack 1, and may be disposed to be substantially perpendicular to a surface direction of the battery cells 10. In addition, the first and second plates 44 and 46 may be respectively fastened to opposite sides of the connection plate 42.

The cell stack 1 may be accommodated in the module frame 40 so that wider surfaces of the battery cells 10 face the first and second plates 44 and 46. Accordingly, the battery cells 10 may be disposed so that the surface direction thereof is parallel to a surface direction of the first and second plates 44 and 46.

The first and second plates 44 and 46 may be spaced apart from each other by a predetermined distance, and may be disposed to be parallel to each other. The first and second plates 44 and 46 may be formed to have the same size or the same area, but the present disclosure is not limited thereto.

The connection plate 42 may be disposed across a space between the first plate 44 and the second plate 46 to divide the space between the first and second plates 44 and 46. The cell stack 1 may be disposed in a distributed manner in the accommodating space D bisected by the connection plate 42. For example, at least two battery cells of the cell stack 1 may be accommodated in the space divided by the connection plate 42, respectively.

The connection plate 42 may be disposed so that a surface direction thereof is perpendicular to a surface direction of the first and second plates 44 and 46. For example, the connection plate 42 may be coupled along central portions of the first plate 44 and the second plate 46, and thus a cross-section of the module frame 40 may be formed to have an "H" shape rotated by 90°. However, the present disclosure is not limited thereto.

The module frame 40 may be formed of a material having high thermal conductivity. For example, the module frame 40 may be formed of a material such as metal, and more specifically, may be formed of a material such as aluminum or steel. However, the present disclosure is not limited thereto. Various materials may be used within the scope of the present disclosure as long as the material has high thermal conductivity.

The cover member 50 may be coupled to the module frame 40 to form a module case for protecting the battery cells 10 together with the module frame 40.

To this end, the cover member 50 may be coupled to the module frame 40 to block the accommodating space D in which the battery cells 10 are accommodated from the outside, thereby separating the accommodating space D from the outside.

The cover member 50 may include a frame cover 52 and a side cover 54.

The frame cover 52 may be formed in the form of a flat plate, and may be disposed on the other side of the cell stack 1 to be coupled to long-side edges of the first and second plates 44 and 46. Accordingly, the frame cover 52 may have one side coupled to the first plate 44 and the other side coupled to the second plate 46, so that the frame cover 52 may be disposed to face the connection plate 42. Accordingly, the cell stack 1 may be disposed between the connection plate 42 and the frame cover 52.

The frame cover 52 may be formed of a material having high thermal conductivity, such as metal. For example, the frame cover 52 may be formed of a material such as aluminum or steel in the same manner as the module frame 40, or may be formed of the same material as that of the module frame 40. However, the present disclosure is not limited thereto. Even when the material is not a metal, various materials may be used as long as the material has thermal conductivity similar to that of the metal.

The side cover 54 may be coupled to short-side edges of the first and second plates 44 and 46, that is, opposite ends of the module frame 40.

The electrode leads 15 of the battery cells 10 may be disposed at the opposite ends of the module frame 40. Accordingly, the side cover 54 may be disposed to face the electrode leads of the battery cells 10 to be coupled to the module frame 40.

The side cover 54 may be formed of a metal material, but is not limited thereto, and may be formed of an insulating material such as resin.

The side cover 54 may be coupled to the module frame 40 and the frame cover 52 through a fixing member such as a rivet, screw, bolt, or snap fit. However, the present disclosure is not limited thereto, and it is also possible to perform coupling in a sliding manner, or using laser welding, spot welding, adhesive, or the like.

In the battery module according to the present example embodiment configured as described above, a cell stack may dissipate heat not only through a frame cover but also through a connection plate. Heat introduced into the connection plate may be transferred to first and second plates to be dissipated to the outside. Accordingly, heat generated from the cell stack may be more effectively dissipated.

An insulating cover 80 and a bus bar assembly 70 may be disposed between the side cover 54 and the electrode leads 15.

The insulating cover 80 may be disposed between the side cover 54 and the bus bar assembly 70 to be described below. For example, one surface of the insulating cover 8 may be coupled to the side cover 54, and the other surface of the insulating cover 80 may be coupled to the bus bar assembly 80.

The insulating cover 80 may be provided to secure electrical insulation between the side cover 54 and the bus bar assembly 70. The insulating cover 80 according to the present example embodiment may be formed of an insulating material such as resin. However, the present disclosure is not limited thereto, and various modifications may be made, as necessary, such as forming the insulating cover 8 using a metal having an insulation-coated surface.

The bus bar assembly 70 may be disposed between the insulating cover 80 and the electrode leads 15.

Figure 4:
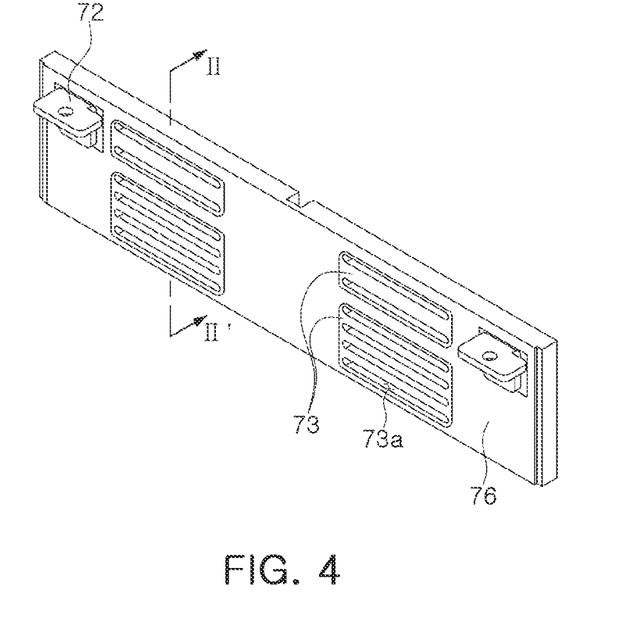
FIG. 4 is an enlarged perspective view of the bus bar assembly illustrated in FIG. 2.
Figure 5:
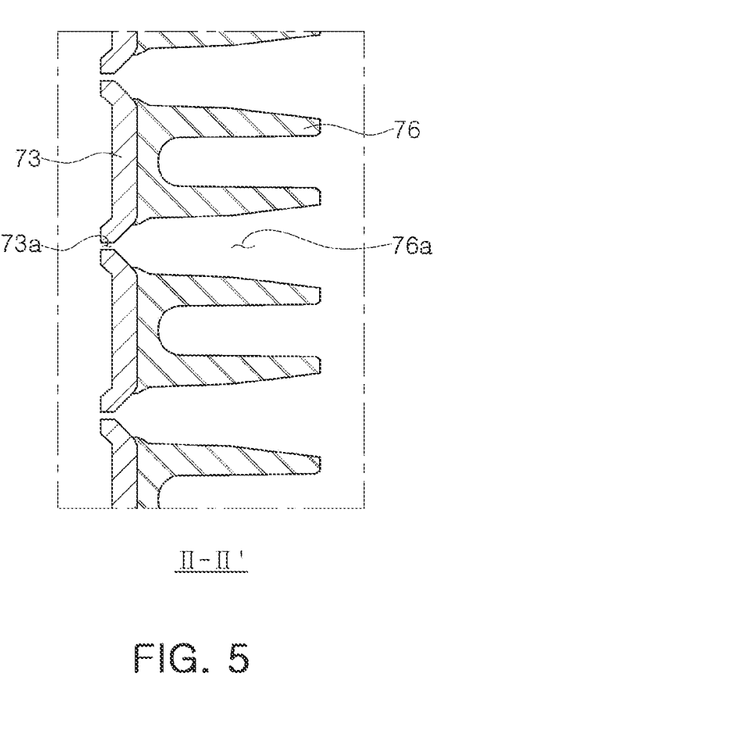
FIG. 5 is a partial cross-sectional view taken along line II-II' of FIG. 4.
Figure 6:
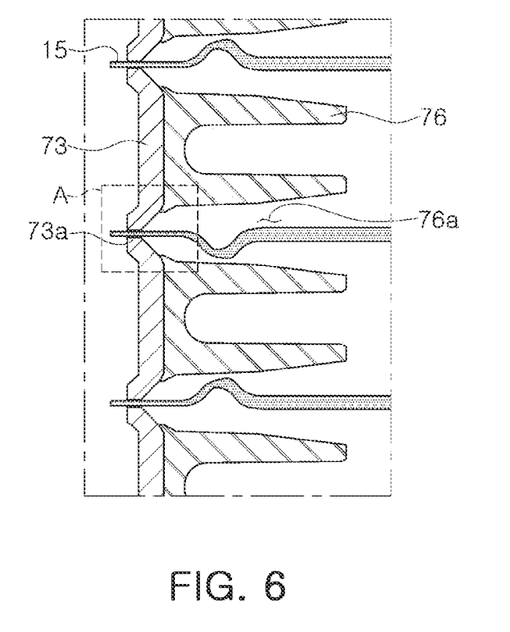
FIG. 6 is a cross-sectional view illustrating a state of a cell stack being coupled in FIG. 4.
Figure 7:
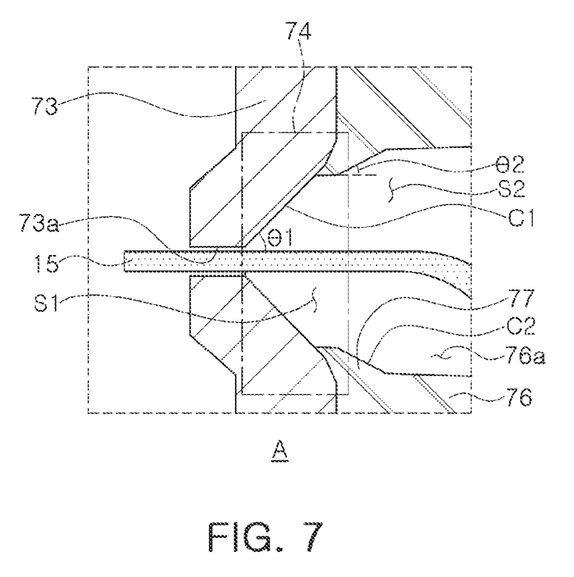
FIG. 7 is an enlarged view of portion A of FIG. 6.

FIG. 4 is an enlarged perspective view of the bus bar assembly 70 illustrated in FIG. 2. FIG. 5 is a partial cross-sectional view taken along line II-II' of FIG. 4. FIG. 6 is a cross-sectional view illustrating a state of a cell stack being coupled in FIG. 4. FIG. 7 is an enlarged view of portion A of FIG. 6.

Referring to FIGS. 4 to 7, the bus bar assembly 70 may be coupled to the electrode leads of the battery cells 10 to electrically connect the electrode leads 15 to each other. To this end, the bus bar assembly 70 may include an electrically insulating support frame or bus bar frame 76 formed of an electrically insulating material to support an electrically conductive connector or bus bar 73 as illustrated.

The bus bar frame 76 may be disposed between the bus bar 73 and the cell stack 1, and the bus bar 73 may be coupled to one side of the bus bar frame 76.

The electrode leads 15 of the battery cells 10 may pass through the bus bar frame 76 to be interconnected with the bus bar 73 on an outer side of the bus bar frame 76. To this end, the bus bar frame 76 may include a plurality of through-holes 76a into which the electrode leads 15 are inserted.

In addition, the bus bar assembly 70 may include a connection terminal 72 for electrically connecting the battery cells 10 to the outside. The connection terminal 72 may be exposed to the outside through a hole 55 formed in the side cover 54. Accordingly, the hole 55 of the side cover 54 may be formed to have a shape corresponding to a size and an outer shape of the connection terminal 72.

In present example embodiment, the connection terminal 72 may include a conductive member, and may be electrically connected to at least one bus bar 73 or may be integrally formed with the at least one bus bar 73.

The bus bar 73 may be formed in the form of a metal plate or a metal alloy plate to be coupled to an outer surface of the bus bar frame 76, or may be formed so that at least a portion thereof is embedded in the bus bar frame 76. The bus bar 73 may have a first surface facing the cell stack 1 and a second surface that is an opposite surface of the first surface.

The battery cells 10 may be electrically interconnected to each other through the bus bar 73, and may be electrically connected to an external element of the battery module 100 through the bus bar 73 and the connection terminal 72.

To this end, the bus bar 73 may include a plurality of through-slits 73a into which the electrode leads 15 are inserted, and the electrode leads 15 may be inserted into the through-slits 73a on a first surface side of the bus bar 73, and then bonded to the bus bar 73 through welding or the like.

Accordingly, at least a portion of an end of the electrode lead 15 may completely pass through the bus bar 73 to be exposed to the outside of a second surface side of the bus bar 73.

The battery module 100 according to the present example embodiment may be manufactured in a process of stacking battery cells 10 to prepare the cell stack 1, and then coupling the bus bar assembly 70 to the cell stack 1. Accordingly, the plurality of electrode leads 15 may need to be coupled to one bus bar assembly 70, and thus the plurality of electrode leads 15 may need to be smoothly and simultaneously inserted into the through-slit 73a.

To this end, in the through-slit 73a according to the present example embodiment, a width of the first surface side of the bus bar 73 may be formed to be greater than a width of the second surface side of the bus bar 73. For example, each of the through-slits 73a may include a first guide portion C1 structured to include a first space S1 wider than a width of a corresponding through-slit 73a for a corresponding electrode lead 15 to be inserted toward the through-slit 73a. The first space S1 may be formed to have a narrower width as a distance from the cell stack 1 increases (or from the first surface to the second surface of the bus bar 73).

More specifically, a first guide portion 74 may be formed on a side of the through-slit 73a facing the cell stack 1 according to the present example embodiment. The first guide portion 74, a portion of the through-slit 73a, may refer to a section for guiding the electrode lead to a central portion of the through-slit 73a, and may specifically refer to a section in which a first inclined surface C1 is formed. Here, the first inclined surface C1 may be formed as a surface inclined with respect to an entry direction of the electrode lead 15.

In a process of the electrode lead 15 being inserted into the through-slit 73a, the end of the electrode lead 15 may be first in contact with the first inclined surface C1 of the first guide portion 74. In this case, the electrode lead 15 may move to the central portion of the through-slit 73a while sliding along the first inclined surface C1 of the first guide portion 74, so that the electrode lead 15 may be easily inserted into the through-slit 73a.

When an inclination angle θ1 of the first inclined surface C1 of the first guide portion 74 is excessively large, it may be difficult for the electrode lead 15 in contact with the first inclined surface C1 to slide toward the central portion of the through-slit 73a. Here, the inclination angle θ1 may refer to an angle between the entry direction of the electrode lead 15 and the first inclined surface C1. In addition, when the inclination angle θ1 is excessively small, a width of the through-slit 73a formed in the first guide portion 74 may become narrower, so that it may be difficult for the electrode lead 15 to smoothly enter the first guide portion 74. In order to resolve this issue, a thickness of the bus bar 73 may need to be increased.

As a result of performing various experiments, it was confirmed that the electrode lead smoothly slid when the inclination angle θ1 of the first inclined surface C1 was 450 or less. In addition, when the inclination angle θ1 of the first inclined surface C1 was less than 27°, the width of the through-slit 73a may become excessively narrower or the bus bar 73 may become excessively thicker. Accordingly, in the present example embodiment, an inclination angle of the first inclined surface C1 may be formed in a range of 27° to 45°.

In the present example embodiment, the first guide portion 74 may be formed through press working. In this case, a boundary portion between the first surface of the bus bar 73 and the first inclined surface C1 may not formed at an angle, but may be formed in a curve as illustrated in FIG. 7, or may be formed at an inclination angle of 45° or more.

Accordingly, when the electrode lead 15 is in contact with the boundary portion, it may be difficult to slide toward a central portion of a through-hole 76a. To this end, in the battery module 100 according to the present example embodiment, a second guide portion 77 may be provided on the bus bar frame 76.

The second guide portion 77 may refer to a portion of the bus bar frame 76 that is disposed to face the first guide portion 74 of the bus bar 73. Here, facing may mean that, when the first guide portion 74 and the second guide portion 77 are projected onto a plane (for example, the first surface of the bus bar 73), the projected first guide portion 74 and the second guide portion 77 partially overlap each other.

Therefore, when the first surface side of the bus bar 73 is viewed from the cell stack 1, the boundary portion of the first guide portion 74 may be covered by the second guide portion 77, and thus may not be identified. To this end, the second guide portion 77 may be formed to protrude from the bus bar frame 76 toward the central portion of the through-hole 76a.

The second guide portion 77 may have a second inclined surface C2. For example, the bus bar frame 76 may include a second guide portion 77 structured to include a second space S2 that extends from the first space S1 and has a width wider than the second space S1.

In the same manner as the first inclined surface C1, the second inclined surface C2 may guide the electrode lead 15 to the central portion of the through-slit 73a. Accordingly, the second inclined surface C2 may be formed to have an inclination angle (for example, 27° to 45°) similar to that of the first inclined surface C1. However, in order to allow the electrode lead 15 to more stably enter the through-slit 73a, an inclination angle θ2 of the second inclined surface C2 may be less than the inclination angle θ1 of the first inclined surface C1. For example, the inclination angle θ1 of the first inclined surface C1 may be 45°, and the inclination angle θ2 of the second inclined surface C2 may be 27°. However, the present disclosure is not limited thereto.

An entire surface of the second guide portion 77 facing the bus bar 73 according to the present example embodiment may be bonded to the bus bar 73. In addition, in the bus bar assembly 70 according to the present example embodiment, a portion of the bus bar frame 76 may be disposed in the through-slit 73a. For example, an end of the second guide portion 77 may be positioned in the through-slit 73a to be bonded to an inclined surface of the first guide portion 74. Accordingly, the second inclined surface C2 may be disposed to extend the first inclined surface C1.

The bus bar frame 76 may be formed of an insulating material, and the bus bar 73 may have a first surface bonded to the bus bar frame 76, or at least a portion of the first surface embedded in the bus bar frame 76. For example, the bus bar 73 may be integrally formed with the bus bar frame 76 through insert injection. In this case, a protruding end of the second guide portion 77 may be more easily bonded to the first inclined surface C1 of the first guide portion 74.

In the battery module 100 configured as described above, a periphery of the through-slit 73a of the bus bar 73 which the electrode lead 15 enters may be formed to have an inclined surface of 27° to 45°. Accordingly, in a manufacturing process of coupling the cell stack 1 and the bus bar assembly 70 to each other, the plurality of electrode leads 15 may be smoothly and simultaneously inserted into the through-slit 73a of the bus bar assembly 70, thereby easily assembling the battery module, and minimizing time required for manufacturing.

While example embodiments have been shown and described above, it will be apparent to those skilled in the art that modifications and variations of the example embodiments and other embodiments could be made based on the present disclosure.

For example, in the above-described example embodiments, a case in which the through a through-slit is elongated in a horizontal direction as battery cells are stacked in a vertical direction is described as an example, but the through-slit may be elongated in a vertical direction.

for another example, a case in which a module case is formed using a frame is described as an example, but the module case may be formed in the form of omitting the frame and enclosing only an exterior of a cell stack, as necessary.

For yet another example, respective example embodiments may be implemented in combination with each other.

What is claimed is:

1. A battery module comprising:
a cell stack including a plurality of battery cells that are stacked on top of one another, the plurality of battery cells including electrode leads;
at least one bus bar formed of an electrically conductive material and structured to provide a plurality of through-slits into which the electrode leads are inserted; and
a bus bar frame formed of an electrically insulating material and disposed between the at least one bus bar and the cell stack to be coupled to the at least one bus bar, the bus bar frame having a plurality of through-holes in which the electrode leads are disposed,
wherein each of the through-slits includes a first guide portion structured to include a first space wider than a width of a corresponding through-slit for a corresponding electrode lead to be inserted toward the through-slit,
wherein the bus bar frame includes a second guide portion structured to include a second space that extends from the first space and has a width wider than the first space,
wherein the first guide portion includes a first inclined surface forming a first space having a tapering cross-section for each of the electrode leads to be inserted into the corresponding through-slit,
wherein at least a portion of the second guide portion is inserted into the first space and contacts the first inclined surface.

2. The battery module of claim 1, wherein the second space of the second guide portion is connected to the first space of the first guide portion.

3. The battery module of claim 1, wherein the second guide portion includes a protruding portion that is continuous with the first guide portion.

4. The battery module of claim 1, wherein the first space tapers in section from an end of a corresponding through-slit close to a corresponding battery cell to another end of the corresponding through-slit far from the corresponding battery cell.

5. The battery module of claim 1, wherein the first inclined surface is formed to have an inclination angle with respect to each of the electrode leads in a range of 27° to 45°.

6. The battery module of claim 1, wherein the second guide portion includes a second inclined surface forming a second space that tapers in section for each of the electrode leads to be inserted into the first space of the first guide portion.

7. The battery module of claim 6, wherein the second inclined surface is formed to have an inclination angle with respect to each of the electrode leads, wherein the inclination angle of the second inclined surface less than an inclination angle of the first inclined surface.

8. The battery module of claim 7, wherein the second inclined surface is formed to have an inclination angle with respect to each of the electrode leads in a range of 27° to 45°.

9. The battery module of claim 1, wherein a surface of the second guide portion facing the at least one bus bar is bonded to the at least one bus bar.

10. The battery module of claim 1, wherein the second guide portion is disposed to cover one surface of the at least one bus bar and a portion of the first inclined surface.

11. A battery module comprising:
a plurality of cell stacks, each cell stack including a plurality of battery cells that are stacked on top of one another, the plurality of battery cells including electrode leads;
a module frame structured to accommodate the plurality of cell stacks;
at least one bus bar structured to provide a plurality of through-slits into which the electrode leads are inserted; and
a bus bar frame disposed between the at least one bus bar and the plurality of cell stacks to be coupled to the at least one bus bar,
wherein each of the through-slits includes a first guide portion structured to include a first space wider than a width of a corresponding through-slit for a corresponding electrode lead to be inserted toward the through-slit, and
the module frame includes a first plate and a second plate disposed in parallel to face each other, and a connection plate disposed between the first plate and the second plate and connecting the first plate to the second plate,
wherein the bus bar frame includes a second guide portion structured to include a second space that extends from the first space and has a width wider than the first space,
wherein the first guide portion includes a first inclined surface forming the first space having a tapering cross-section for each of the electrode leads to be inserted into the corresponding through-slit,
wherein at least a portion of the second guide portion is inserted into the first space and contacts the first inclined surface.

12. The battery module of claim 11, wherein the connection plate divides a space between the first plate and the second plate into different subspaces, and the plurality of cell stacks is disposed in a distributed manner in the different subspaces.

13. The battery module of claim 11, further comprising:
a frame cover extending between ends of the first plate and the second plate and disposed to face the connection plate,
wherein each of the plurality of cell stacks is disposed between the connection plate and the frame cover.

14. The battery module of claim 11, further comprising:
a side cover extending between ends of the first plate and the second plate and disposed to face each of the electrode leads of the plurality of battery cells to be coupled to the module frame.

15. The battery module of claim 11, wherein a wider surface of each of the plurality of battery cells faces the first plate or the second plate.

16. The battery module of claim 11, wherein at least a portion of the bus bar frame extends toward in a corresponding through-slit.

* * * * *